Nov. 29, 1955  C. M. RIVELY  2,725,495
DISCHARGE LAMP
Filed June 4, 1951

INVENTOR
C. M. RIVELY
BY
ATTORNEY

United States Patent Office 2,725,495
Patented Nov. 29, 1955

2,725,495

DISCHARGE LAMP

Clair M. Rively, White Meadow Lake, N. J., assignor to Westinghouse Electric Corporation, East Pittsburgh, Pa., a corporation of Pennsylvania Application June 4, 1951, Serial No. 229,775

6 Claims. (Cl. 313—38)

This invention relates to discharge lamps and, more particularly, to such lamps adapted for motion picture projectors employed in television broadcasting.

The conventional television studio motion picture projection layout, usually comprises the television camera chain, possibly two motion picture projectors, and a still projector mounted on concrete bases in quadrature about a revolvable prismatic mirror. The motion picture projectors have in the past been equipped with a small reflector and a collector lens between the lamp and the film. The light then passes through other projector lenses and a complicated shutter and synchronizing mechanism for shutting out the projection lamp during film travel from frame to frame. The film speed for 35 mm. film is 32 frames/sec., while the speed of 16 mm. film is 24 frames/sec.

The television camera chain may comprise an iconoscope or other pick-up tubes and a synchronized signal output circuit.

An iconoscope consists essentially of a thin mica plate mounted within a vitreous envelope and coated with a photo-sensitive material or mosaic on the image side and a metallic conducting coating on the signal side. Light from the projector strikes the photo-sensitive surface and liberates free electrons which are collected on circumferential metallic rings suitably disposed about the mica plate. An electron scanning gun of the magnetic deflection type is mounted obliquely on the lower portion of the envelope in order to scan, by the interlacing system, the odd and then the even lines of the photo-sensitive surface from left to right. The vertical retrace time is generally 5% of a cycle or 1/1200 of a second.

Electrons from the beam strike the positively charged light-sensitized portions of the mosaic and, through the capacitative coupling of the mosaic with the conductive coating on the signal side of the mica, produce a transmitted output signal. The camera speed is 30 frames per second with two fields per frame on 60 cycle operation.

In order to eliminate the shutter and synchronizing mechanism, a flashing lamp has been employed which requires no shutter. This lamp consists of a vitreous envelope with refractory electrodes disposed in each end and an inert gas fill such as krypton. The electrodes consist of a pointed refractory metal rod or a refractory metal wire to which a surrounding tungsten slip coil is welded with or without a thorium strip insert or other similar combinations well known in the art.

It operates from a condenser discharge in a tank circuit which is resonant at 600 cycles per second. A thyratron valve tube is employed to prevent back current and to restrict the illuminating time to the desired 1/1200 of a second, 60 times a second. The vertical retrace time of 1/1200 of a second of the iconoscope electron gun is synchronized in the camera chain to coincide with the illuminating time or flashes of the lamp.

In this manner the mosaic is exposed at a time when no picture signal is being transmitted.

Since, for example, in the 16 mm. case, the film pull down speed is 24 frames per second, while the lamp flashing frequency is 60 times per second, the number of flashes on succeeding frames may follow a 2, 2, and 3 flash pattern.

However, it was found that in all the above-mentioned flashing lamp electrodes the electrode arc spot tended to wander about the periphery of the pointed tip of the electrode or into the cavities between turns of the slip coil, thereby sometimes increasing the light when the spot was in front and sometimes decreasing the light when the spot was in back of the point of the tip. This arc spot wandering gave a non-uniform light output, and unsatisfactory picture reproduction.

In addition, the tungsten rod had no affinity for the thorium at the tip and the arc sought craters of thorium between turns of the slip coil. After a short operation the excess thorium evaporated from the slip coil deposited on the envelope, thus shortening the useful life of the lamp.

It was further found that during 1199/1200 of a second between flashes of the lamp the residual incandescent light from the electrodes passing through the moving film produced an objectionable smear or "travel ghost" on the mosaic of the iconoscope and the resultant transmitted picture. To remedy this, a ceramic shield fitting about the electrode with a small amount of clearance was employed. However, this ceramic shield operated hot enough to incandesce to an extent less than the electrode but sufficiently to require the use of a filter thereby also decreasing light output.

Hence, it has been found advantageous, according to my invention, to carbonize the tip of a thoriated tungsten wire electrode and employ a pure tungsten slip coil as a heat radiator in order that the arc will emanate uniformly from the tip of the electrode. Further, the tungsten carbide tip has an affinity for thoria and thus increases the useful life of the lamp. In addition, a loose-fitting metal shield spun onto an insulating ceramic holder was added to each electrode. The shield is readily cooled by conduction through the lamp fill gas during operation and effectively eliminates travel ghosts.

In its general aspect, the present invention has as its object the elimination of the disadvantages and defects of the prior art television projection lamp.

A specific object of the invention is an electrode for a television projection lamp comprising a carbonized tip and a heat radiator tungsten slip coil.

Another object is an electrode for a television projection lamp which will produce a uniform light intensity from flash to flash.

A further object is an electrode for a television projection lamp which will effectively reduce bulb deposit and produce long lamp life.

An additional object is a metallic shield for an electrode for a television projection lamp which will effectively eliminate travel ghosts on the transmitted picture.

Other objects of the invention will appear to those skilled in the art to which it appertains as the description thereof proceeds, both by direct recitation thereof and by implication from the context.

Referring to the accompanying drawing, in which like numerals of reference indicate similar parts throughout the several views.

Figure 1:
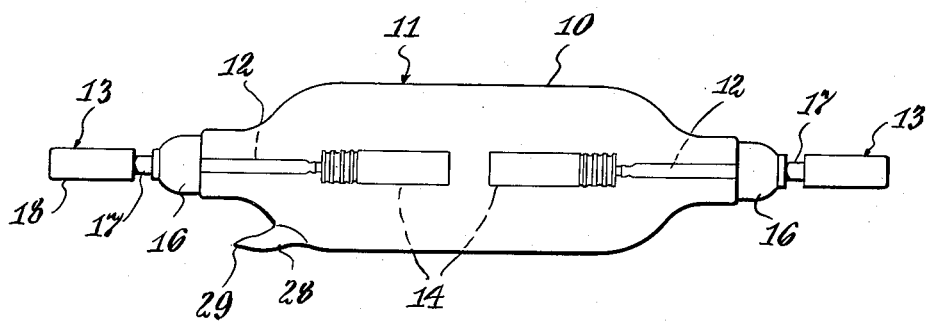
Fig. 1 is an elevational view of a television projection lamp embodying my invention.

In the accompanying drawing, the reference numeral 10 designates a tubular vitreous envelope of a television projection lamp 11. This envelope 10 is tapered at both ends for sealing in two oppositely disposed electrode mounts 12, each of which comprises a leading-in and supporting assembly 13, and an electrode assembly 14.

This leading-in and supporting assembly 13 consists of a hollow inner support 15, a metallic sealing cup 16, an outer leading-in conductor 17, and an outer contact 18. Said support 15, cup 16, and conductor 17 are axially joined as by welding or brazing to form a vacuum-tight seal. The outer extremity of conductor 17 is joined, as by brazing, to the outer contact 18.

Each electrode assembly 14 consists of an electrode 19, a refractory metal light shield 20, a disc-like ceramic holder 21, a slip coil 25, an inner spacing sleeve 26, and an outer spacing sleeve 27. The cylindrical shield 20 spun on the holder 21 prevents the residual incandescent electrode light from entering the lens system during lamp operation. A suitable axial hole 22 is provided in holder 21 for mounting shield 20 and holder 21 on electrode 19.

Figure 2:
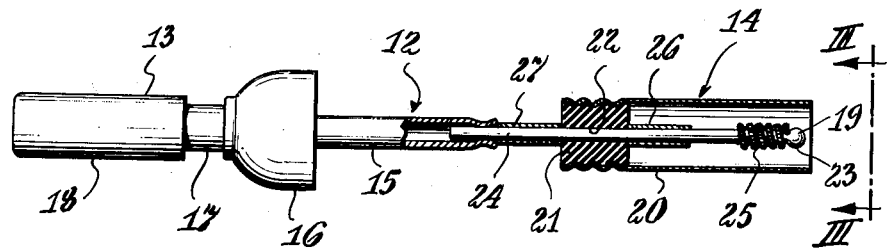
Fig. 2 is an elevational view, partially in axial section, of an electrode mount of the television projection lamp of Fig. 1.
Figure 3:
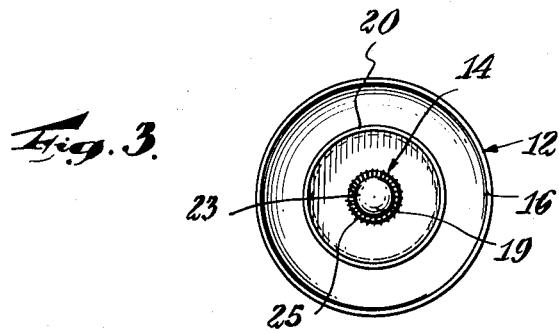
Fig. 3 is an end or axial view of the electrode mount, in the direction of the arrows on line III—III of Fig. 2.

The electrode 19 is a refractory metal wire 24, suitably tungsten, containing a small percentage of thoria and having a tungsten carbide tip 23. This tip 23 may be formed by dipping one end of the wire 24 into an aqueous suspension of colloidal graphite and arcing the tip in an inert atmosphere to produce the rounded tungsten carbide configuration, as shown in Fig. 2.

To assemble electrode mount 12, the refractory slip coil 25 is then added as a radiator of heat and welded in place on the wire 24. Metallic cylindrical spacing sleeves 26 and 27 maintain the open end of shield 20 in such a position as to project a slight distance beyond the tip 23 of electrode 19. The portion of wire 24 which projects beyond sleeve 27 is inserted into the hollow support 15 of leading-in and supporting assembly 13 and secured thereon as by crimping, thereby forming electrode mount 12.

An electrode mount 12 is hermetically sealed, by means of cup 16, into each end of envelope 10, maintaining an appropriate spacing distance of approximately 3/16" and an overall lamp length of about 6½". A suitable tubulation 28, which desirably does not project radially beyond the outline of the envelope, is provided in envelope 10 for the evacuation thereof.

After a suitable exhaust, which may consist of the usual bake, degassification of the internal metal parts, and electrode treating, the envelope 10 of the lamp 11 is filled with gas such as xenon, at a suitable pressure for initiating and sustaining a discharge. The envelope 10 is finally tipped off at 29, as shown in Fig. 1.

During operation of the lamp, the tungsten carbide tip 23 is the hottest part of the electrode 19 and thoria in the wire 24 is reduced to thorium which migrates or diffuses to the surface of the tip where the tungsten carbide has an affinity for the mono-molecular layer of thorium formed thereon. Since the lamp is flashed 60 times per second, and the peak current per flash is about 60 amperes, the thorium migrates to the spot that was cathode and hence the hottest spot during the previous flash maintaining successive flashes from the same cathode spot at the end of the tip 23, and producing a uniform light output from flash to flash. If the carbonized tip 23 is not employed, the arc prefers the crater formed by the slip coil 25. If the slip coil 25 is not used, the size of wire 24 must be increased measurably to dissipate the heat. Use of a larger diameter wire 24 also results in a wandering arc.

Without metallic shield 20 the direct light from the incandescent electrode 19 during lamp operation produces objectionable travel ghosts on the mosaic of the iconoscope. This metallic shield 20, rapidly cooled by radiation and conduction through the inert gas fill of the lamp 11, does not itself incandesce, and effectively eliminates residual incandescent electrode light and the undesirable smear or travel ghosts without the aid of an objectionable light-output-consuming filter.

Thus it will be seen from the foregoing description, that the television projection lamp 11 of the present invention has eliminated the disadvantages, and defects of the prior art projection lamps. The electrode 19, a thoriated tungsten wire 24 having a carbonized tip 23, prevents arc wandering and produces a uniform light intensity. The carbonized tip 23 has an affinity for the thorium and efficiently reduces bulb blackening and produces a lamp of longer life. A metallic heat shield 20 is provided on the electrode 19 which effectively cuts off residual incandescent light from the electrodes 19 and thus eliminates travel ghosts on the mosaic of the iconoscope.

While a preferred embodiment of my invention has been disclosed, it will be understood that modifications may be made within the spirit and scope of the appended claims.

I claim:

1. A television projection flashing lamp comprising a vitreous envelope, oppositely disposed leading-in and supporting assemblies hermetically sealed to said envelope, a gas in said envelope for initiating and sustaining a discharge, an electrode assembly at the end of each leading-in and supporting assembly and between which an arc discharge occurs during operation of said lamp; at least one of said leading-in and supporting assemblies comprising in order a hollow inner electrode support, a sealing cup substantially behind said inner electrode support, an outer conductor and an outer contact axially joined together, at least one of said electrode assemblies comprising a refractory metal electrode having thereon a refractory slip coil for radiating heat, a metallic inner light shield holder spacer, a ceramic light shield holder, a metallic outer light shield holder spacer, and a refractory metal non-incandescible light shield on said holder surrounding said electrode for eliminating residual incandescent light from said electrode between flashes.

2. A television projection flashing lamp comprising a vitreous envelope, oppositely disposed leading-in and supporting assemblies hermetically sealed to said envelope, a gas in said envelope for initiating and sustaining a discharge, an electrode assembly at the end of each leading-in and supporting assembly and between which an arc discharge occurs during operation of said lamp; at least one of said leading-in and supporting assemblies comprising in order an inner electrode support, a sealing cup, an outer conductor and an outer contact axially joined together, at least one of said electrode assemblies comprising a refractory metal electrode having thereon a refractory slip coil for radiating heat, a metallic inner light shield holder spacer, a ceramic light shield holder, a metallic outer light shield spacer and a refractory metal non-incandescible light shield on said holder surrounding said electrode for eliminating residual incandescent light from said electrode; said electrode comprising a thoriated refractory metal wire having a carbided tip for producing uniformly positioned light output from flash to flash.

3. A television projection flashing lamp comprising a vitreous envelope, oppositely disposed leading-in and supporting assemblies hermetically sealed to said envelope, a gas in said envelope for initiating and sustaining a discharge, an electrode assembly at the end of each leading-in and supporting assembly and between which an arc discharge occurs during operation of said lamp; at least one of said leading-in and supporting assemblies comprising in order an inner electrode support, a sealing cup, an outer conductor and an outer contact axially joined together; at least one of said electrode assemblies comprising a refractory metal electrode having thereon a refractory slip coil for radiating heat, a metallic inner light shield holder spacer, a ceramic light shield holder a metallic outer light shield holder spacer and a refractory metal non-incandescible light shield on said holder surrounding said electrode for eliminating residual incandescent light from said electrode; said electrode comprising a thoriated tungsten wire having a rounded tungsten carbided tip for producing uniformly positioned light output from flash to flash.

4. An electrode assembly for a television projection flashing lamp comprising a refractory metal electrode having thereon a refractory slip coil for radiating heat, a metallic inner light shield holder spacer, a ceramic light shield holder, a metallic outer light shield holder spacer and a refractory metal non-incandescible light shield on said holder surrounding said electrode for eliminating residual incandescent light from said electrode.

5. An electrode assembly for a television projection flashing lamp comprising a refractory metal electrode having thereon a refractory slip coil for radiating heat, a metallic inner light shield holder spacer, a ceramic light shield holder, a metallic outer light refractory metal non-incandescible light shield on said holder surrounding said electrode for eliminating residual incandescent light from said electrode; said electrode comprising a thoriated refractory metal wire having a carbide tip for producing uniformly positioned light output from flash to flash.

6. An electrode assembly for a television projection flashing lamp comprising a refractory metal electrode having thereon a refractory slip coil for radiating heat, a metallic inner light shield holder spacer, a light shield holder and an outer light shield holder spacer and a non-incandescible light shield on said holder surrounding said electrode for eliminating residual incandescent light from said electrode; said electrode comprising a thoriated tungsten wire having a rounded tungsten carbide tip for producing uniformly positioned light output from flash to flash.

References Cited in the file of this patent
UNITED STATES PATENTS

| | | | |
|---|---|---|---|
| 2,071,874 | Dobben | Feb. 23, | 1937 |
| 2,146,579 | Inman | Feb. 7, | 1939 |
| 2,153,009 | Scott | Apr. 4, | 1939 |
| 2,156,068 | Ruttenauer | Apr. 25, | 1939 |
| 2,249,672 | Spanner | July 15, | 1941 |
| 2,282,533 | Simon | May 12, | 1942 |
| 2,422,038 | Parisot | June 10, | 1947 |
| 2,469,331 | Eitel | May 3, | 1949 |